（12）United States Patent
Yanagawa

(10) Patent No.: US 7,398,425 B2
(45) Date of Patent: Jul. 8, 2008

(54) INFORMATION PROCESSING APPARATUS INCLUDING NAND FLASH MEMORY, AND INFORMATION PROCESSING METHOD FOR THE SAME

(75) Inventor: Katsuhiko Yanagawa, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 486 days.

(21) Appl. No.: 11/035,084

(22) Filed: Jan. 13, 2005

(65) Prior Publication Data

US 2005/0157554 A1 Jul. 21, 2005

(30) Foreign Application Priority Data

Jan. 20, 2004 (JP) ............................. 2004-012121

(51) Int. Cl.
*G06F 11/00* (2006.01)
(52) U.S. Cl. ....................................... 714/36
(58) Field of Classification Search .................... 714/36
See application file for complete search history.

(56) References Cited

U.S. PATENT DOCUMENTS 5,075,841 A * 12/1991 Kaneko ........................ 714/36
5,155,844 A * 10/1992 Cheng et al. ................... 714/36
5,535,357 A * 7/1996 Moran et al. ................. 711/103
6,601,167 B1 * 7/2003 Gibson et al. ................... 713/2
7,058,779 B1 * 6/2006 McClain ..................... 711/170
7,165,137 B2 * 1/2007 Chang et al. ................. 711/102
2001/0052067 A1* 12/2001 Klein ............................ 713/1
2005/0262337 A1* 11/2005 Ziesmer et al. ................. 713/2
2005/0273589 A1* 12/2005 Gong ............................. 713/2
2006/0107031 A1* 5/2006 Kouno et al. ................... 713/2
2007/0174602 A1* 7/2007 Kao ............................. 713/2

OTHER PUBLICATIONS

Microsoft Computer Dictionary 4th Ed., Microsoft Press, 1999, p. 159.*

* cited by examiner

*Primary Examiner*—Christopher S McCarthy
(74) *Attorney, Agent, or Firm*—Canon U.S.A. Inc., I.P. Division

(57) ABSTRACT

An information processing apparatus includes a non-volatile memory including a first block where data error does not occur and a second block where data error is possible to occur. The first block stores a loader program, and the second block stores an apparatus controlling program. The loader program is executed to write the apparatus controlling program stored in the second block to a volatile memory, and the apparatus controlling program is executed on the volatile memory. Thus, the information processing apparatus can be provided at a reduced cost, using a NAND flash memory, which is inexpensive, to store a program.

21 Claims, 12 Drawing Sheets

INFORMATION PROCESSING APPARATUS INCLUDING NAND FLASH MEMORY, AND INFORMATION PROCESSING METHOD FOR THE SAME

BACKGROUND OF THE INVENTION

1. Field of the Invention

The present invention relates to an information processing apparatus including a NAND flash memory and to an information processing method for the same.

2. Description of the Related Art

Conventionally, NOR flash memories are used to allow storing program codes for microprocessors and electrically rewriting the contents of the program codes. On the other hand, NAND flash memories, which are much less expensive than NOR flash memories, are used to store data.

NAND flash memories, however, have the problem that bit error could occasionally occur because of their structure. Thus, error that has occurred must be corrected, for example, by error correcting code (ECC). Error correction by hardware requires circuitry of a large scale since error correcting algorithms are complex.

A NAND flash memory includes a block where it is ensured, by restricting the number of times of rewriting allowed, that bit error does not occur. This block is referred to as a first block. The first block has a capacity on the order of 8 KB, which is not sufficient to store a program. Furthermore, since random access is very slow in a NAND flash memory, performance is degraded when a program is executed on a NAND flash memory.

SUMMARY OF THE INVENTION

It is an object of the present invention to provide an information processing apparatus at a reduced cost, using a NAND flash memory, which is inexpensive, to store a program.

It is another object of the present invention to allow execution of a program without degrading performance, using a NAND flash memory, with which random access is slow, to store a program.

According to an aspect of the present invention, an information processing apparatus is provided. The information processing apparatus includes a non-volatile memory including a first block where data error does not occur and a second block where data error is possible to occur, the first block storing a loader program and the second block storing an apparatus controlling program; a volatile memory; and an execution unit for executing the loader program to write the apparatus controlling program stored in the second block to the volatile memory, and for executing the apparatus controlling program on the volatile memory.

According to another aspect of the present invention, an information processing method for an information processing apparatus is provided. The information processing apparatus includes a volatile memory and a non-volatile memory. The non-volatile memory includes a first block where data error does not occur and a second block where data error is possible to occur. The first block stores a loader program, and the second block stores an apparatus controlling program. The information processing method includes the steps of executing the loader program to write the apparatus controlling program stored in the second block to the volatile memory; and executing the apparatus controlling program written to the volatile memory.

Further objects, features and advantages of the present invention will become apparent from the following description of the preferred embodiments with reference to the attached drawings.

DESCRIPTION OF THE PREFERRED EMBODIMENTS

Now, preferred embodiments of the present invention will be described in detail with reference to the accompanying drawings.

First Embodiment

Figure 1:
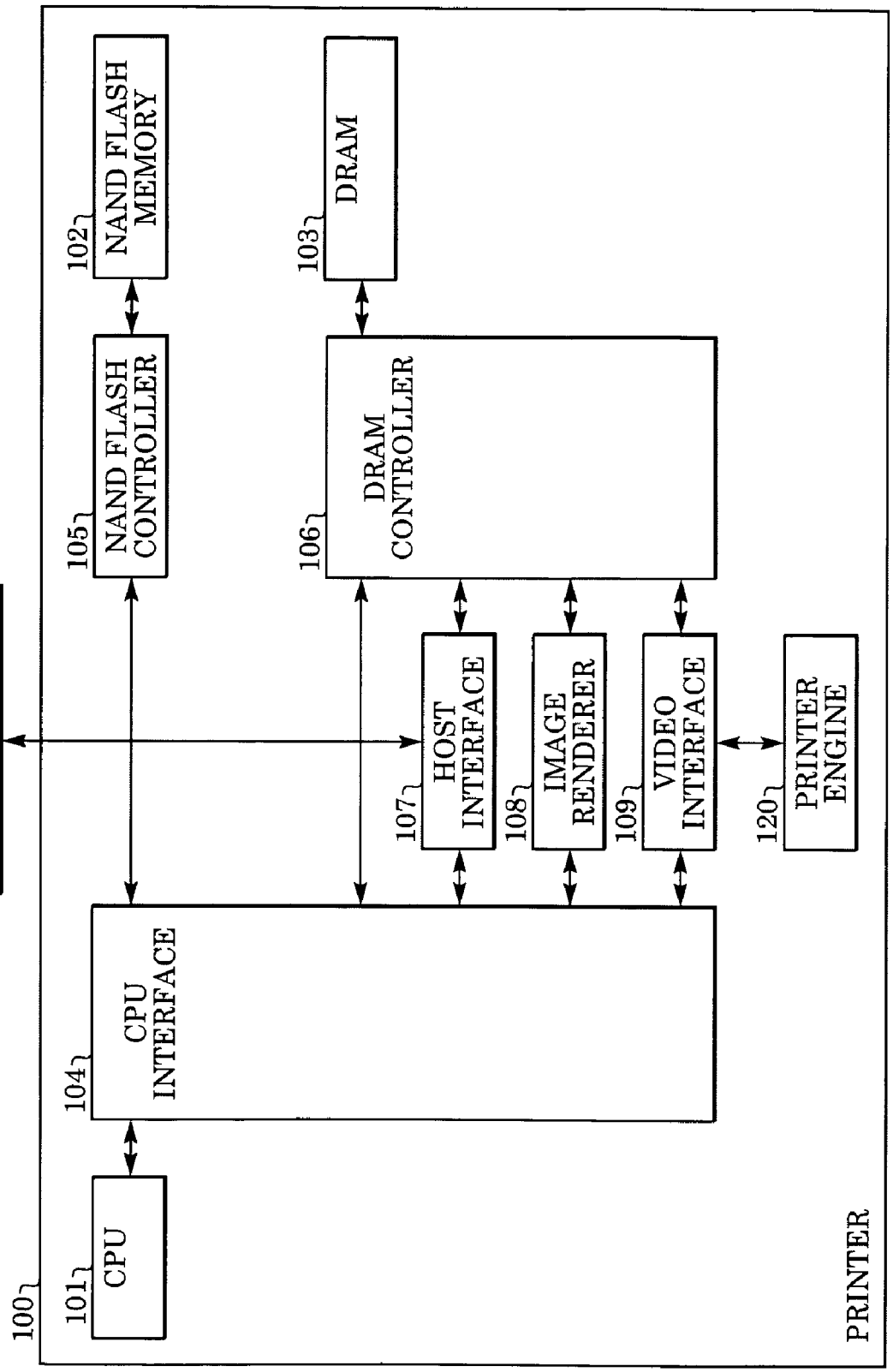
FIG. 1 is a block diagram of an information processing apparatus according to a first embodiment of the present invention.

FIG. 1 shows a system configuration according to a first embodiment of the present invention. Referring to FIG. 1, a host computer 200 is connected to a printer 100 and controls the printer 100.

Now, the construction of the printer 100 will be described. A central processing unit (CPU) 101 is in charge of controlling the entire printer 100. A NAND flash memory 102 is an electrically erasable and writable non-volatile memory. A dynamic random access memory (DRAM) 103 is a volatile memory. A CPU interface 104 functions as an interface between the CPU 101 and other functional blocks. A NAND flash controller 105 controls access to the NAND flash memory 102. A DRAM controller 106 controls access to the DRAM 103. A host interface 107 carries out communications with the host computer 200. An image renderer 108 generates bitmap images. A video interface 109 converts image data loaded on the DRAM 103 into serial video signals. A printer engine 120 executes printing based on video signals.

The NAND flash memory 102 holds stored content even when power is turned off. Instead of the NAND flash memory 102, other types of non-volatile memory, for example, an AND flash memory, may be used. The DRAM 103 holds stored content only while power is turned on. Instead of the DRAM 103, other types of volatile memory may be used.

Figure 2:
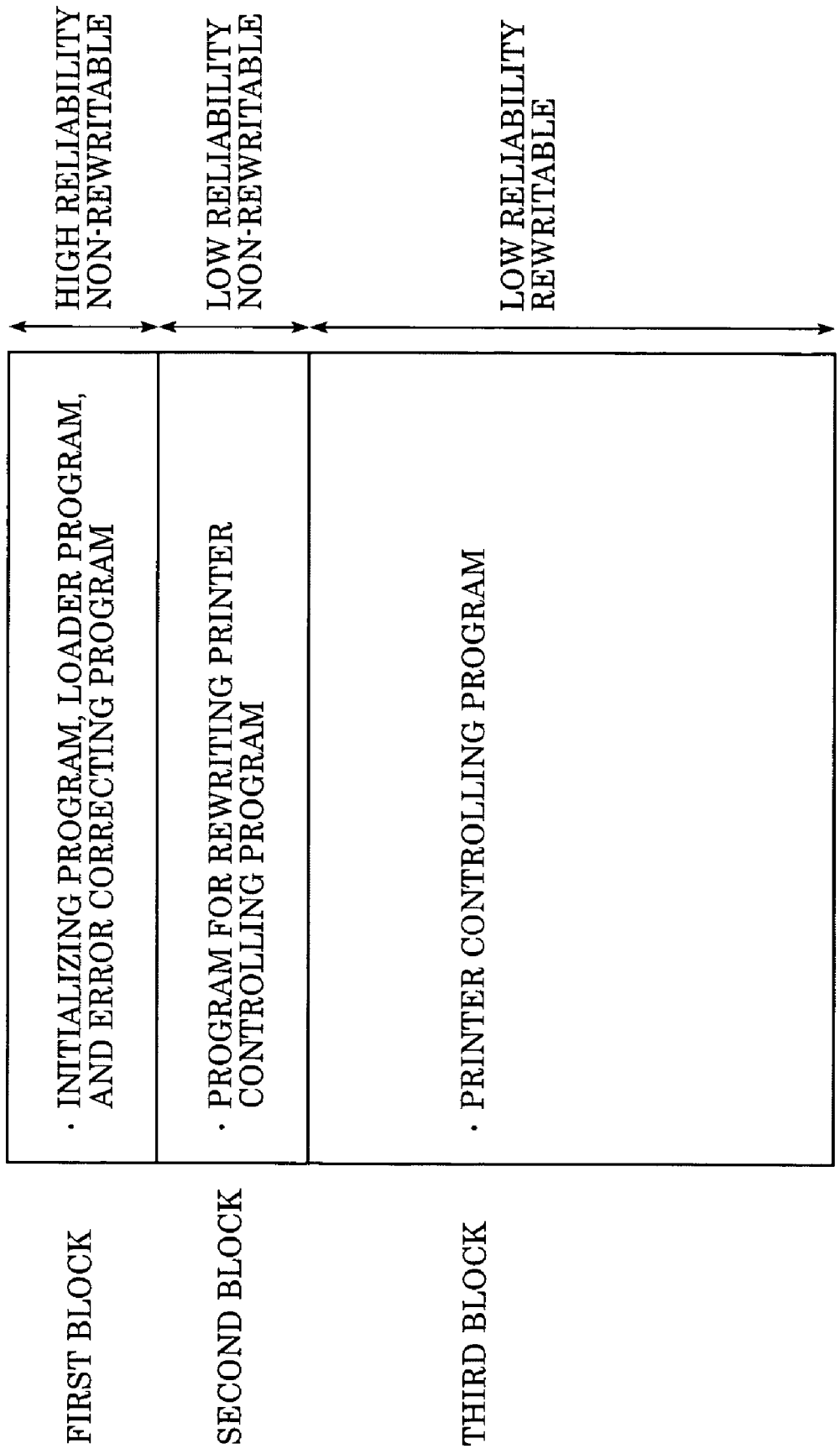
FIG. 2 is a diagram showing content stored in a NAND flash memory in the first embodiment.

FIG. 2 shows program codes stored in the NAND flash memory 102. The NAND flash memory 102 is divided into a first block, a second block, and a third block. The first block is a block having a high reliability, in which data error does not occur when data is read. The second block is a block having a low reliability, in which data error is possible to occur when data is read. The third block is also a block having a low reliability, in which data error is possible to occur when data is read. The first to third blocks respectively store the following program codes:

First Block
   Hardware initializing program for initializing CPU and DRAM
   Loader program for writing program codes stored in the second block and the third block to DRAM
   Error correcting program based on error correcting codes Second Block
   Printer-controlling-program rewriting program Third Block
   Printer controlling program The loader program copies the program codes stored in the second and third blocks to the DRAM 103. The error correcting program, based on error correcting codes, detects data error that occurs when data is read, and corrects the data error. The error correcting program is included as a part of the loader program.

The printer-controlling-program rewriting program is a program for rewriting the printer controlling program stored in the third block. The CPU 101 executes the rewriting program to rewrite only the third block storing the printer controlling program without rewriting the first and second blocks. The rewriting program may be stored in the first block instead of the second block.

In the NAND flash memory 102, the first and second blocks are non-rewritable blocks, and the third block is a rewritable block. The NAND flash memory 102 includes a memory cell array, and a data register having a width of 528 bytes. Data is read from or written to the memory cell array not directly but via the data register. For example, when data at address 0 is read, data of one page (528 bytes) including data at address 0 is transferred to the data register, and then the data is read. Thus, an access that involves updating of the data register requires time for the transfer, so that the access takes a longer time.

Therefore, the programs in the first block are programmed so that updating of the data register occurs only minimally, for example, by minimizing branch instructions.

The program codes are stored in advance by a ROM programmer (not shown) or the like.

Figure 4:
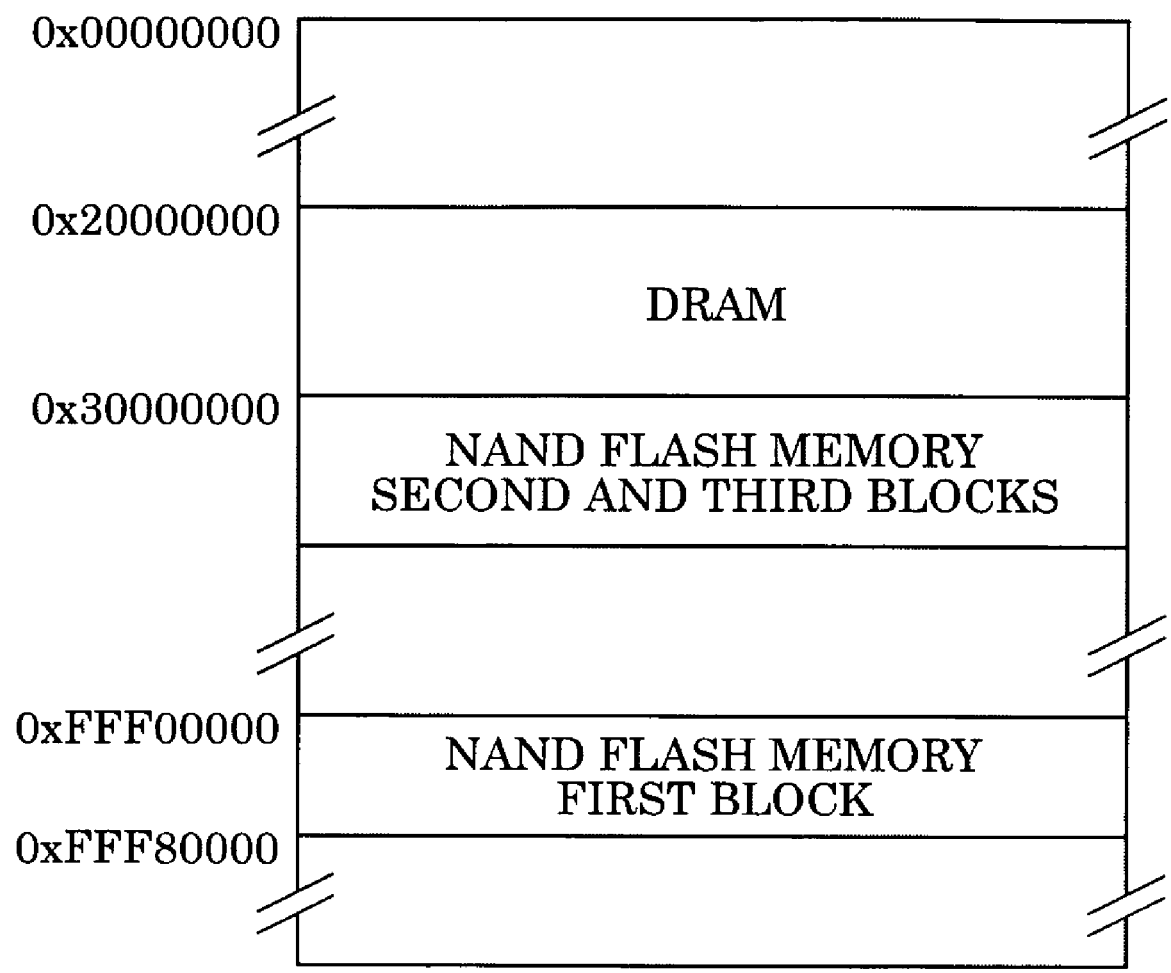
FIG. 4 is a diagram showing mapping of a CPU in the first embodiment.

The CPU interface 104 maps the blocks of the NAND flash memory 102 and the block of the DRAM 103 to the CPU 101, as shown in FIG. 4. The CPU interface 104, by default, allocates a boot address of the CPU 101 to the first block.

Next, an access operation by the CPU 101 in the construction shown in FIG. 1 will be described. When the printer 100 is powered on to exit reset, the CPU 101 generates a boot access to the CPU interface 104 in order to execute a first program fetch. The CPU interface 104 decodes an address received, and issues a read access to the NAND flash controller 105 when the address is determined as a boot address. Upon receiving the read access, the NAND flash controller 105 accesses the NAND flash memory 102 for reading. The NAND flash controller 105 then receives read data and sends the data to the CPU 101. When the CPU 101 accesses the DRAM 103, the CPU interface 104 accesses the DRAM controller 106, and the DRAM controller 106 accesses the DRAM 103 while executing arbitration with direct memory access (DMA) by the host interface 107 or the like.

Figure 3:
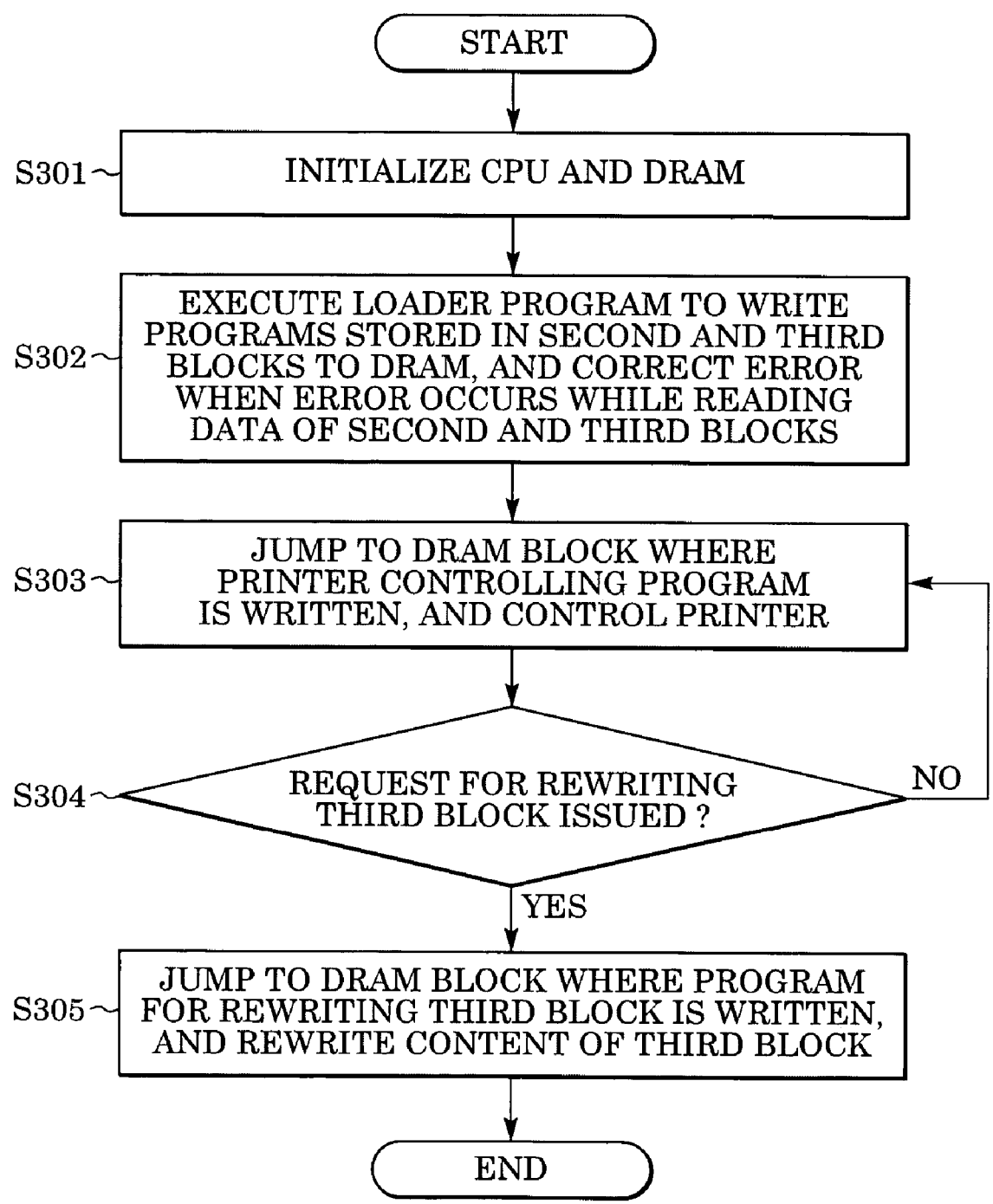
FIG. 3 is a flowchart of an operation according to the first embodiment.

Next, an operation under the construction described above will be described with reference to a flowchart shown in FIG. 3.

When the printer 100 is powered on to exit reset, the CPU 101, by a boot access, executes the CPU/DRAM initializing program stored in the first block of the NAND flash memory 102 to initialize the CPU 101 and the DRAM 103 (S301).

Then, the CPU 101 executes the loader program stored in the first block to copy program codes stored in the second and third blocks of the NAND flash memory 102 to the DRAM 103. When data error is detected while reading codes stored in the second and third blocks, the error is corrected by the error correcting program (S302).

Then, the CPU 101 jumps to the block of the DRAM 103 where the printer controlling program is written, starting control of the printer 100 (S303).

When a request for rewriting the printer controlling program stored in the third block of the NAND flash memory 102 is issued while controlling the printer 100 (S304), the CPU 101 jumps to the block of the DRAM 103 where the printer-controlling-program rewriting program is written, executing rewriting of the third block of the NAND flash memory 102 (S305).

Second Embodiment

In a NAND flash memory, access speed is considerably slow when an access involving updating of an internal register occurs. In the first embodiment described above, the loader program for copying the contents of the second and third blocks to the DRAM is executed directly on the NAND flash memory 102. Thus, access for fetching and access for reading from the second or third block occur alternately, and these accesses relate to different blocks. Therefore, the internal data register is updated frequently, so that the access speed, and therefore the execution of the loader program, becomes slower. A second embodiment of the present invention is directed to overcoming this problem.

Figure 5:
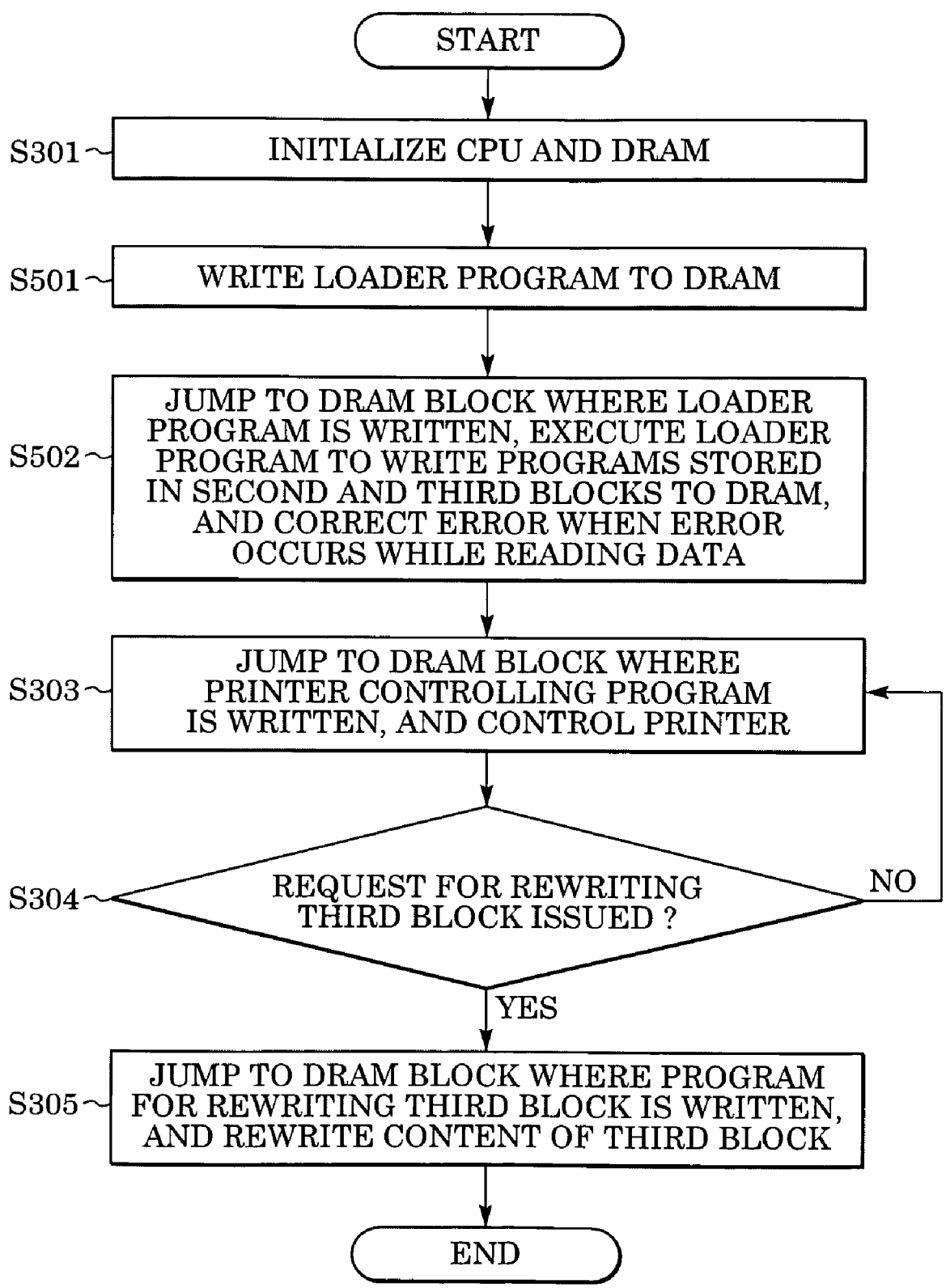
FIG. 5 is a flowchart of an operation according to a second embodiment of the present invention.

FIG. 5 is a flowchart of an operation according to the second embodiment. Steps corresponding to those in the first embodiment are designated by the same numerals, and step S302 in the first embodiment (FIG. 3) is replaced with steps S501 and S502 in the second embodiment.

After the CPU 101 and the DRAM 103 are initialized, the CPU 101 writes the loader program stored in the NAND flash memory 102 to the DRAM 103 (S501).

Then, the CPU 101 jumps to the block of the DRAM 103 where the loader program is written to execute the loader program, writing the programs stored in the second and third blocks to the DRAM 103. When error occurs while reading data, the error is corrected (S502).

The subsequent steps are the same as the corresponding steps in the first embodiment.

By executing the loader program on the DRAM 103 as described above, when the contents of the second and third blocks are read, the CPU 101 does not generate a fetch cycle involving the NAND flash memory 102. Thus, the internal data register is updated only at a cycle of 528 bytes, so that the loader program is executed quickly.

Third Embodiment

Figure 6:
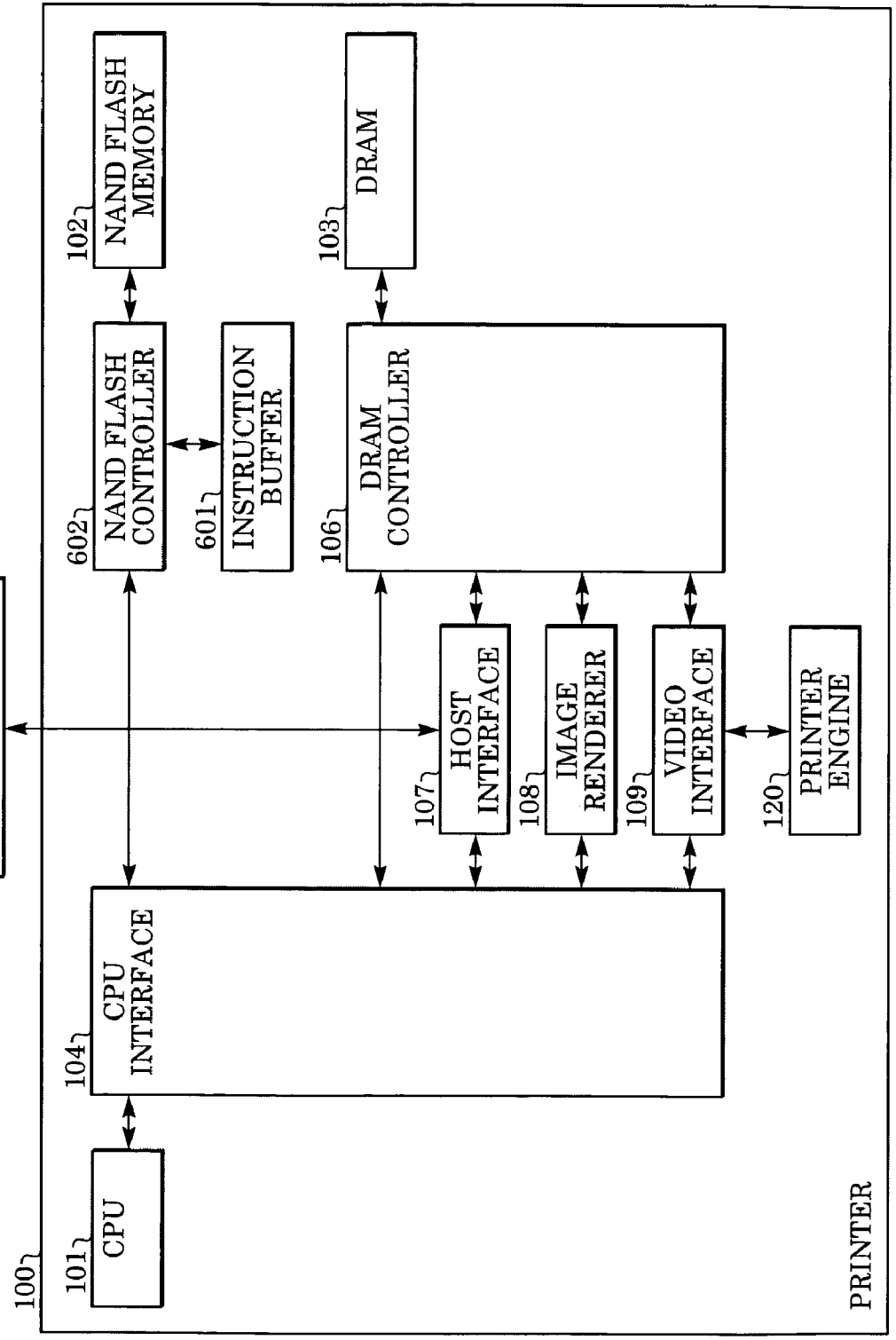
FIG. 6 is a block diagram of an information processing apparatus according to a third embodiment of the present invention.

FIG. 6 shows a block diagram of an information processing apparatus according to a third embodiment of the present invention.

An instruction buffer 601 for storing instruction codes is a memory having a capacity corresponding to one page of the NAND flash memory 102 (512 bytes). A NAND flash controller 602, compared with the NAND flash controller 105 in the first embodiment, additionally has a function of controlling the instruction buffer 601. The other modules are the same as the corresponding modules in the first embodiment, and are designated by the same numerals.

Figure 7:
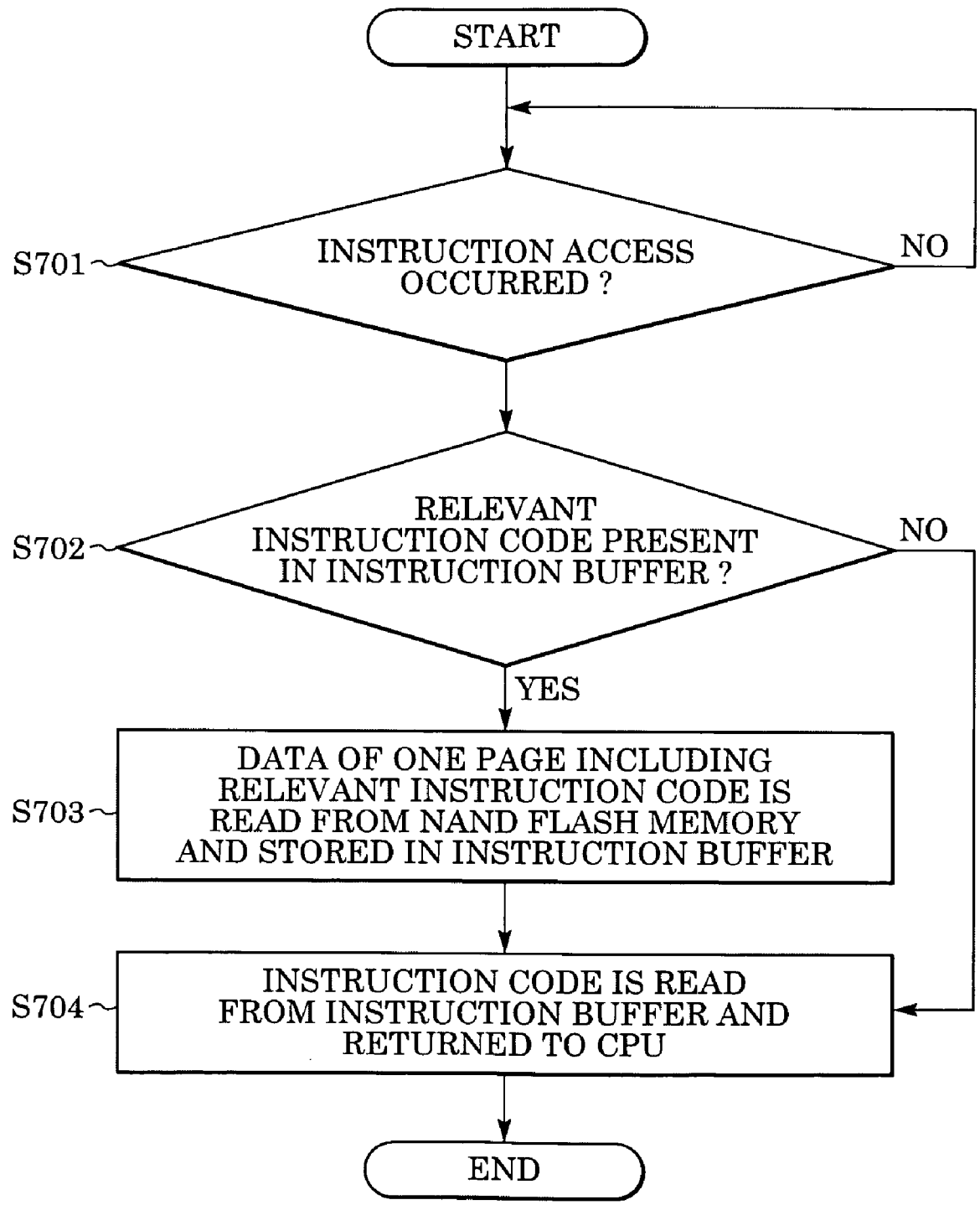
FIG. 7 is a flowchart of an operation according to the third embodiment.

Next, an operation of the NAND flash controller 602 will be described with reference to a flowchart shown in FIG. 7.

The NAND flash controller 602, upon receiving an instruction fetch access from the CPU 101 (S701), determines whether an instruction code relevant to the request is present in the instruction buffer 601 (S702).

When the instruction code relevant to the request is present, the NAND flash controller 602 reads the instruction code from the instruction buffer 601, and returns the instruction code to the CPU 101 (S704).

When the instruction code is absent, the NAND flash controller 602 reads data of one page including the instruction code from the NAND flash memory 102, and stores the data in the instruction buffer 601 (S703). Then, the NAND flash controller 602 reads the instruction code from the instruction buffer 601, and returns the instruction code to the CPU 101 (S704).

Accordingly, the CPU 101 is allowed to fetch an instruction quickly. Furthermore, quick operation is maintained even when a branch instruction is used within one page (256 bytes).

Fourth Embodiment

Figure 8:
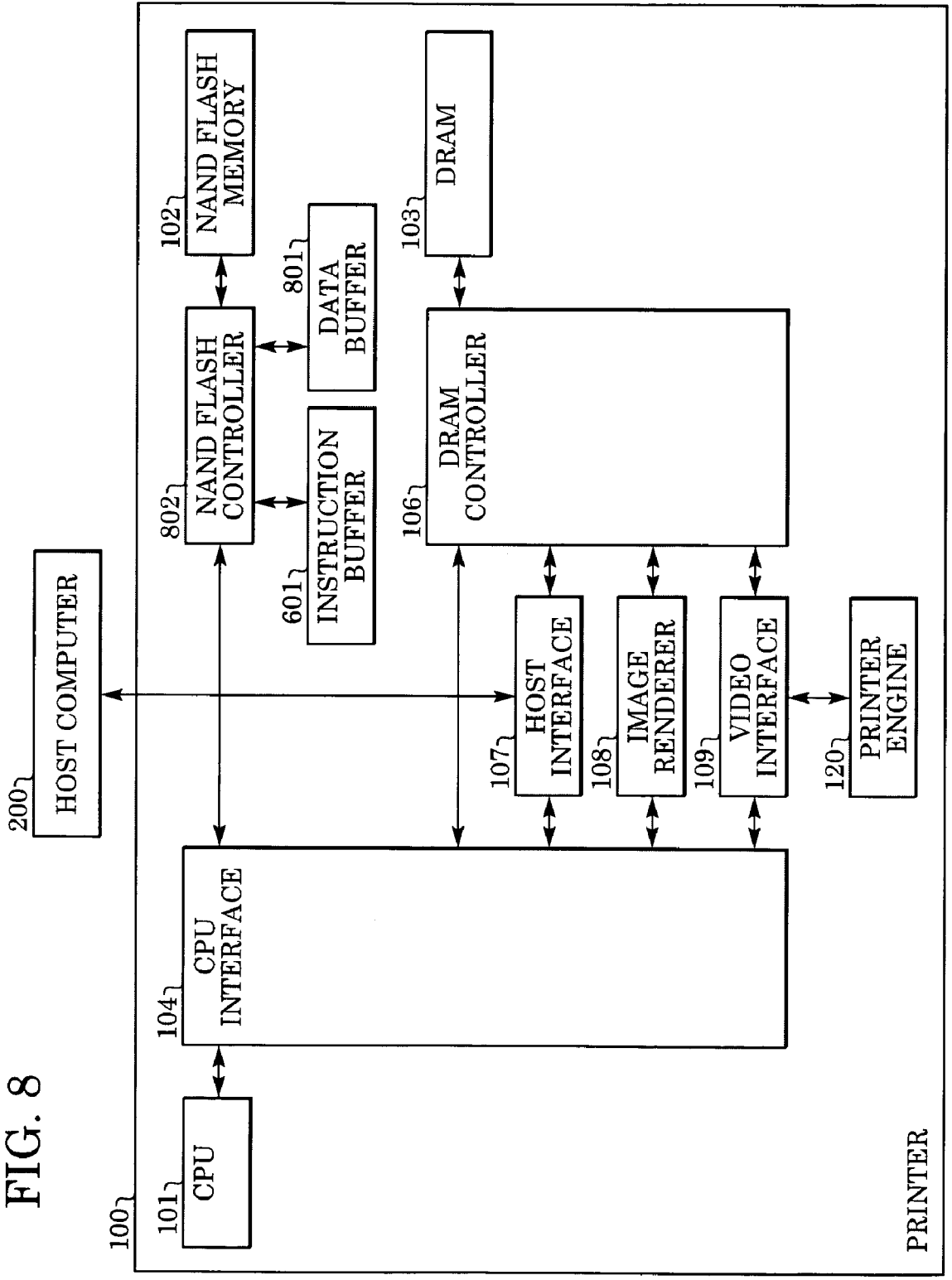
FIG. 8 is a block diagram of an information processing apparatus according to a fourth embodiment of the present invention.

FIG. 8 is a block diagram of an information processing apparatus according to a fourth embodiment of the present invention.

A data buffer 801 for storing data is a memory having a capacity corresponding to one page of the NAND flash memory 102 (528 bytes). A NAND flash controller 802, compared with the NAND flash controller 602 in the third embodiment, additionally has a function of transferring data of one page (528 bytes) from the NAND flash memory 102 to the data buffer 801 by direct memory access (DMA). The other modules are the same as the corresponding modules in the third embodiment, and are designated by the same numerals.

Since the contents stored in the data storage blocks (i.e., the second and third blocks) of the NAND flash memory 102 are data, the contents need not be mapped directly to the CPU 101. Furthermore, if the contents are directly mapped to the CPU 101, the capacity of the NAND flash memory 102 is restricted to the address space of the CPU 101.

Thus, only the capacity of the data buffer 801 is mapped to the CPU 101, and data of the NAND flash memory 102 is accessed via the data buffer 801 to achieve indirect mapping. The blocks of the NAND flash memory 102 that the CPU 101 does not access directly are not mapped to the CPU 101.

Figure 9:
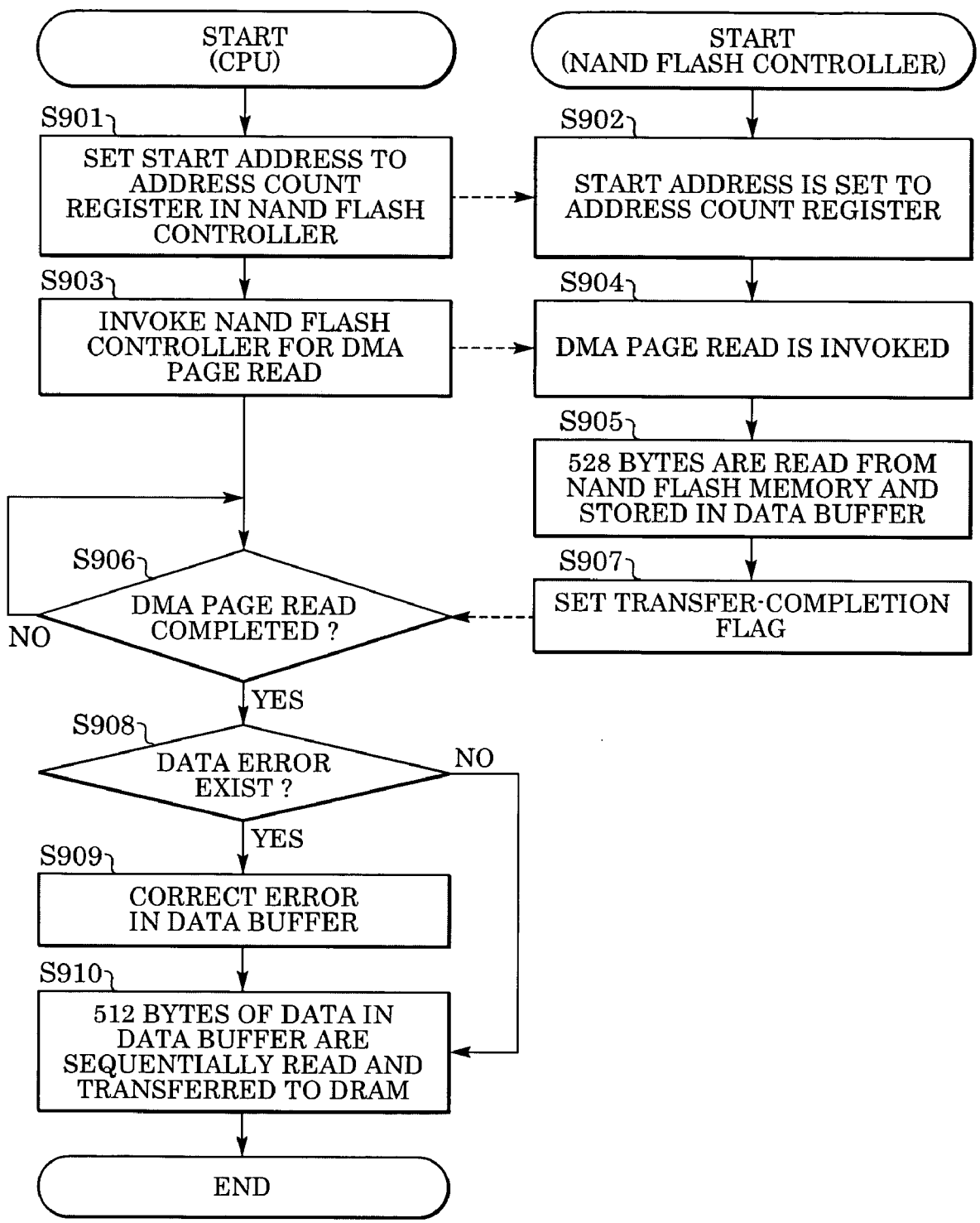
FIG. 9 is a flowchart of an operation according to the fourth embodiment.

Next, an operation according to this embodiment will be described with reference to a flowchart shown in FIG. 9.

The CPU 101 sets a start address to an address count register (not shown) in the NAND flash controller 802 (S901 and S902).

The CPU invokes the NAND flash controller 802 for a DMA page read (S903 and S904).

The NAND flash controller 802 reads 528 bytes from the NAND flash memory 102 and stores the data in (transfers the data to) the data buffer 801 (S905).

The CPU 101 waits for completion of the DMA page read (S906).

The NAND flash controller 802 sets a transfer-completion flag upon completion of the DMA page read, notifying the CPU 101 of the completion (S907).

Upon completion of the DMA page read, the CPU 101 checks whether data error is present in the data read (S908). When data error is present, the CPU 101 corrects the error in the data buffer 801 (S909).

The CPU 101 sequentially reads 512 bytes of the body of data in the data buffer 801, and transfers the data to the DRAM 103 (S910).

Accordingly, the problem of mapping is solved, and since data is read from the data buffer 801, data access operations become quicker.

Fifth Embodiment

Figure 10:
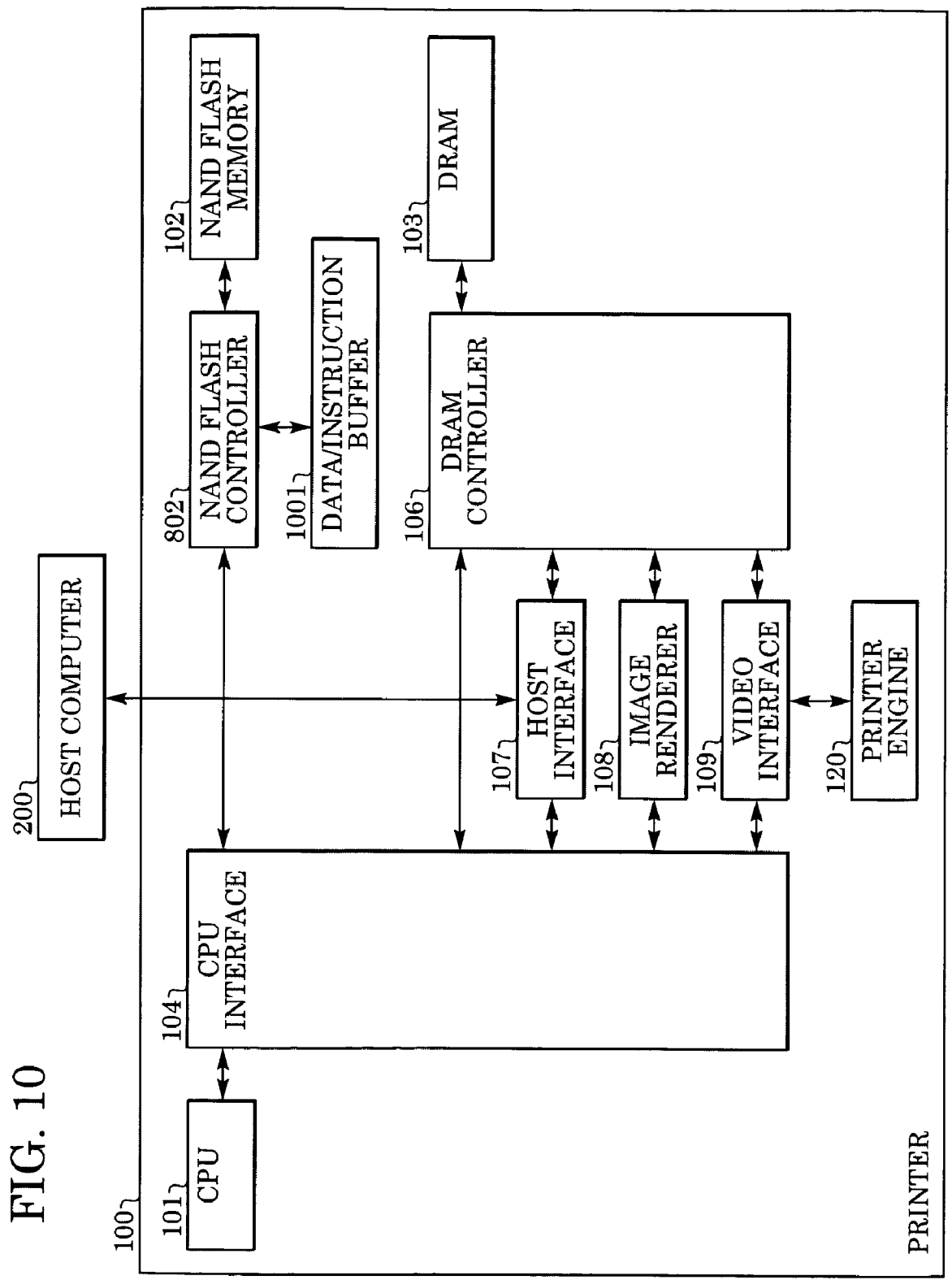
FIG. 10 is a block diagram of an information processing apparatus according to a fifth embodiment of the present invention.

FIG. 10 shows a block diagram of an information processing apparatus according to a fifth embodiment of the present invention.

A data/instruction buffer 1001 is a buffer for storing data and instruction codes, and it is a buffer that is capable of operating selectively as the instruction buffer 601 in the third embodiment or the data buffer 801 in the fourth embodiment. The other modules are the same as the corresponding modules in the fourth embodiment, and are designated by the same numerals.

The data/instruction buffer 1001 is by default used as an instruction buffer, and is used as a data buffer when the function thereof is switched to a data buffer.

When a program is copied to the DRAM and the CPU 101 jumps to the DRAM 103 to execute the program, an instruction buffer is not needed. Thus, the function of the data/instruction buffer 1001 is switched from an instruction buffer to a data buffer. This serves to reduce cost.

Sixth Embodiment

Figure 11:
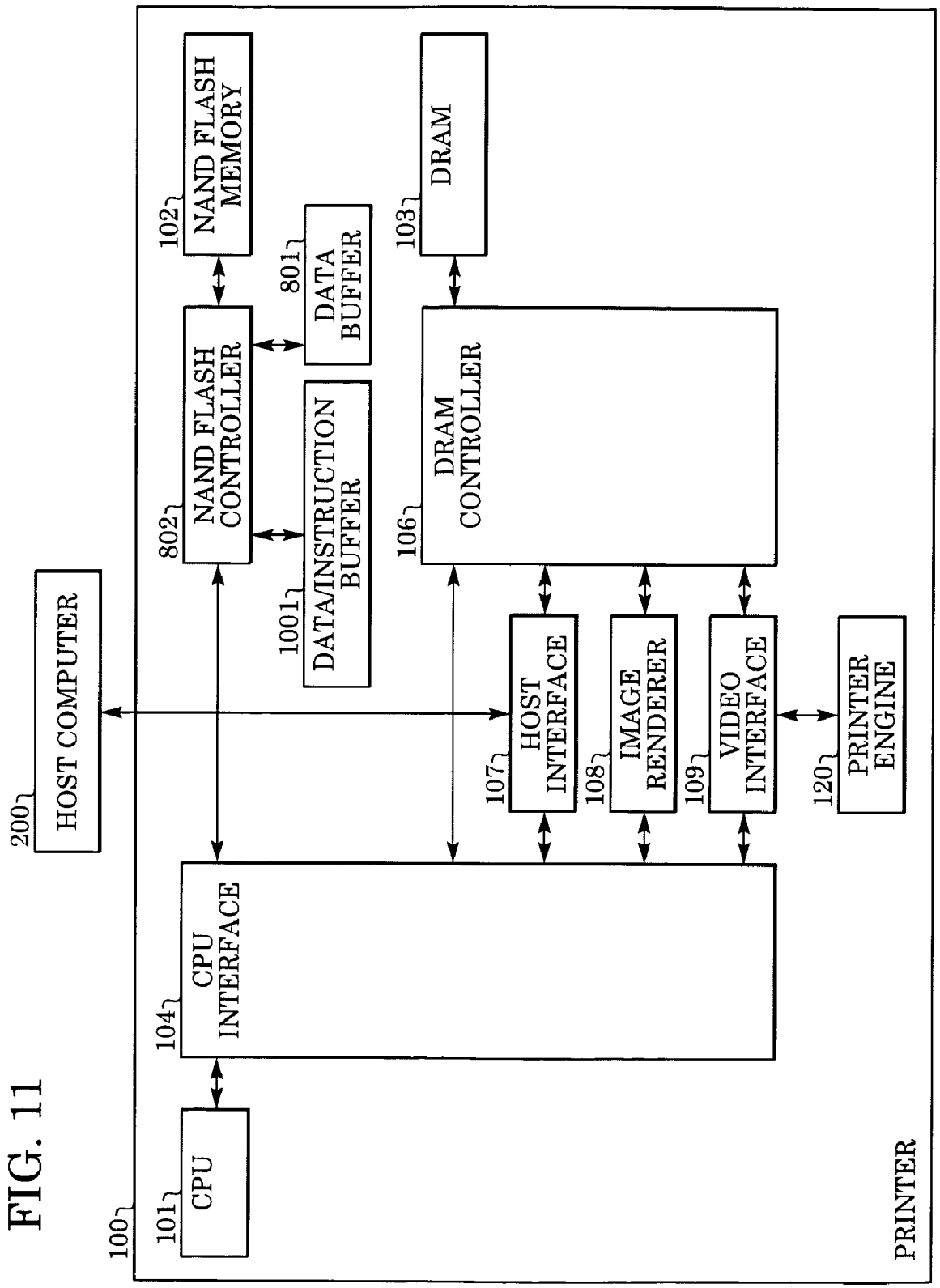
FIG. 11 is a block diagram of an information processing apparatus according to a sixth embodiment of the present invention.

FIG. 11 is a block diagram of an information processing apparatus according to a sixth embodiment of the present invention. In FIG. 11, functional modules corresponding to those in the fourth and fifth embodiments are designated by the same numerals.

In this embodiment, a data/instruction buffer 1001 and a data buffer 801 are provided. When a program is being executed on the NAND flash memory 102, the data/instruction buffer 1001 is used as an instruction buffer. On the other hand, when a program is being executed on the DRAM 103, the data/instruction buffer 1001 is used as a data buffer. That is, when a program is being executed on the DRAM 103, two data buffers are used. In the NAND flash memory 102, when an access involving updating of the internal data register occurs, access speed becomes considerably slow. However, while waiting for data transfer from the NAND flash memory 102 via a buffer, data can be transferred from another buffer to the DRAM 103.

Figure 12:
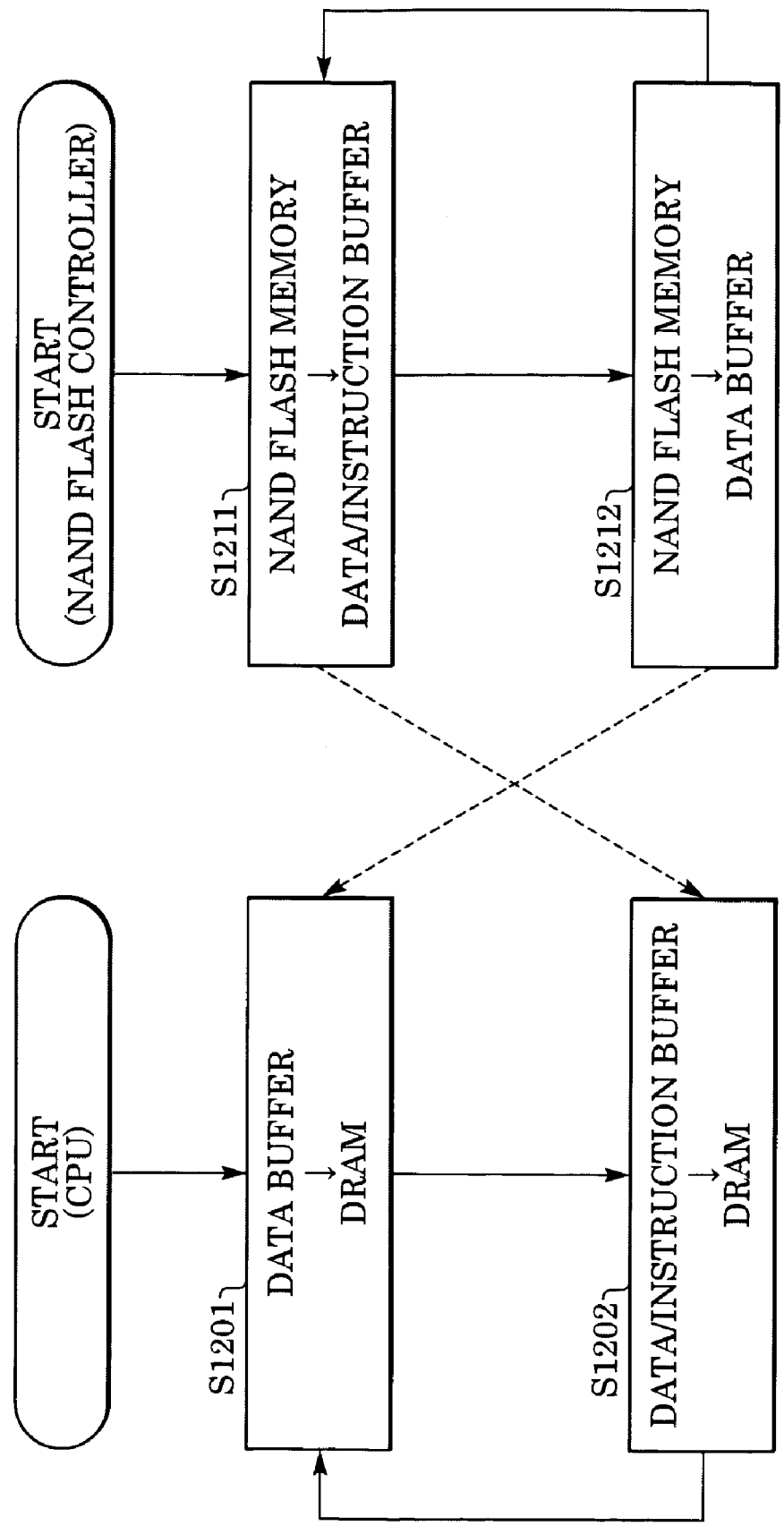
FIG. 12 is a flowchart of an operation according to the sixth embodiment.

An operation according to this embodiment will be described with reference to a flowchart shown in FIG. 12. When the NAND flash controller 802 is transferring data by a DMA page read from the NAND flash memory 102 to the data/instruction buffer 1001 (S1211), the CPU 101 transfers data from the data buffer 801 to the DRAM 103 (S1201). On the other hand, when the NAND flash controller 802 is transferring data by a DMA page read from the NAND flash memory 102 to the data buffer 801 (S1212), the CPU 101 transfers data from the data/instruction buffer 1001 to the DRAM 103 (S1202).

Accordingly, quick data transfer is allowed without considerably increasing cost.

As described above, according to the first to sixth embodiments, by restricting the number of times of rewriting allowed, it is ensured only in the first block of the NAND flash memory 102 that data error does not occur.

Since the hardware initializing program and the loader program are not allowed to be rewritten or are allowed to be rewritten only a small number of times, these programs are stored in the first block of the NAND flash memory 102, which is reliable. Since the printer controlling program is allowed to be rewritten or is rewritten a large number of times, the printer controlling program is stored in the third block of the NAND flash memory 102, which has a low reliability. Thus, booting from the NAND flash memory 102, which is less expensive than a NOR flash memory, is allowed. This serves to reduce the cost of the apparatus.

Accordingly, it is allowed to store program code of a microprocessor (CPU) in a NAND flash memory and to directly fetch the program code. This serves to reduce the cost of the apparatus.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-012121 filed Jan. 20, 2004, which is hereby incorporated by reference herein.

What is claimed is:

1. An information processing apparatus comprising:
    a non-volatile memory including a first block where data error does not occur, a second block where data error is possible to occur, the first block storing a loader program and the second block storing an apparatus controlling program, and a rewriting program for rewriting the apparatus controlling program;
    a volatile memory; and
    execution means for executing the loader program to write the apparatus controlling program stored in the second block to the volatile memory, for executing the apparatus controlling program on the volatile memory, and for executing the rewriting program to rewrite the apparatus controlling program stored in the second block without rewriting the first block.

2. The information processing apparatus according to claim 1, wherein the loader program includes an error correcting program for detecting data error that occurs when data is read and for correcting the data error.

3. The information processing apparatus according to claim 1, wherein the first block further stores a hardware initializing program, and the execution means executes the hardware initializing program to initialize hardware.

4. The information processing apparatus according to claim 3, wherein the hardware initializing program is a program for initializing the volatile memory or the execution means.

5. The information processing apparatus according to claim 1, wherein when the rewriting program is stored in a rewriting-program storage block in the second block, the execution means executes the rewriting program to rewrite a block storing the apparatus controlling program without rewriting the rewriting-program storage block.

6. The information processing apparatus according to claim 1, wherein the loader program is transferred from the first block to the volatile memory and is executed on the volatile memory.

7. The information processing apparatus according to claim 1, further comprising:
    an instruction buffer for storing instruction codes; and
    non-volatile-memory controlling means;
    wherein on occasion of a fetch access to the non-volatile memory by the execution means, when an instruction code relevant to the fetch access is present in the instruction buffer, the non-volatile-memory controlling means reads the instruction code from the instruction buffer and outputs the instruction code to the execution means, and when the instruction code relevant to the fetch access is absent in the instruction buffer, the non-volatile-memory controlling means transfers one page of instruction codes including the instruction code from the non-volatile memory to the instruction buffer, reads the instruction code from the instruction buffer, and outputs the instruction code to the execution means.

8. The information processing apparatus according to claim 1, further comprising:
    a data buffer for storing data; and
    non-volatile-memory controlling means for transferring data in the non-volatile memory, specified by the execution means, to the data buffer.

9. The information processing apparatus according to claim 1, further comprising a data buffer for storing data, wherein the execution means excludes a block of the non-volatile memory, the block being accessed indirectly via the data buffer, from mapping.

10. The information processing apparatus according to claim 1, further comprising:
    a data and instruction buffer for storing data and instruction codes; and
    buffer controlling means;
    wherein the buffer controlling means uses the data and instruction buffer as an instruction buffer by default, and on occasion of a fetch access to the non-volatile memory by the execution means, when an instruction code relevant to the fetch access is present in the data and instruction buffer, the buffer controlling means reads the instruction code from the data and instruction buffer and outputs the instruction code to the execution means, and when the instruction code relevant to the fetch access is absent in the data and instruction buffer, the buffer controlling means transfers one page of instruction codes including the instruction code from the non-volatile memory to the data and instruction buffer, reads the instruction code from the data and instruction buffer, and outputs the instruction code to the execution means, and when the data and instruction buffer is switched to a data buffer, the buffer controlling means transfers data in the non-volatile memory, specified by the execution means, to the data buffer.

11. The information processing apparatus according to claim 1, further comprising:
  a data buffer for storing data;
  a data and instruction buffer for storing data and instruction codes; and
  buffer controlling means for using the data and instruction buffer as an instruction buffer when a program is being executed on the non-volatile memory while using the data and instruction buffer as a data buffer when a program is being executed on the volatile memory.

12. The information processing apparatus according to claim 1, wherein the non-volatile memory is a NAND flash memory or an AND flash memory.

13. The information processing apparatus according to claim 1, wherein the volatile memory is a dynamic random access memory.

14. An information processing method for an information processing apparatus including a volatile memory and a non-volatile memory, the non-volatile memory including a first block where data error does not occur and a second block where data error is possible to occur, the first block storing a loader program and the second block storing an apparatus controlling program and a rewriting program for rewriting the apparatus controlling program, the information processing method comprising the steps of:
  executing the loader program to write the apparatus controlling program stored in the second block to the volatile memory;
  executing the apparatus controlling program written to the volatile memory; and
  executing the rewriting program to rewrite the apparatus controlling program stored in the second block without rewriting the first block.

15. An information processing apparatus comprising:
  a non-volatile memory including a first block where data error does not occur and a second block where data error is possible to occur, the first block storing a loader program and the second block storing an apparatus controlling program;
  a volatile memory;
  execution means for executing the loader program to write the apparatus controlling program stored in the second block to the volatile memory, and for executing the apparatus controlling program on the volatile memory; and
  a data buffer for storing data, wherein the execution means excludes a block of the non-volatile memory, the block being accessed indirectly via the data buffer, from mapping.

16. The information processing apparatus according to claim 15, wherein the loader program includes an error correcting program for detecting data error that occurs when data is read and for correcting the data error.

17. The information processing apparatus according to claim 15, wherein the first block further stores a hardware initializing program, and the execution means executes the hardware initializing program to initialize hardware.

18. The information processing apparatus according to claim 15, further comprising:
  an instruction buffer for storing instruction codes; and
  non-volatile-memory controlling means;
  wherein on occasion of a fetch access to the non-volatile memory by the execution means, when an instruction code relevant to the fetch access is present in the instruction buffer, the non-volatile-memory controlling means reads the instruction code from the instruction buffer and outputs the instruction code to the execution means, and when the instruction code relevant to the fetch access is absent in the instruction buffer, the non-volatile-memory controlling means transfers one page of instruction codes including the instruction code from the non-volatile memory to the instruction buffer, reads the instruction code from the instruction buffer, and outputs the instruction code to the execution means.

19. The information processing apparatus according to claim 15, further comprising non-volatile-memory controlling means for transferring data in the non-volatile memory, specified by the execution means, to the data buffer.

20. The information processing apparatus according to claim 15, further comprising:
  a data and instruction buffer for storing data and instruction codes; and
  buffer controlling means;
  wherein the buffer controlling means uses the data and instruction buffer as an instruction buffer by default, and on occasion of a fetch access to the non-volatile memory by the execution means, when an instruction code relevant to the fetch access is present in the data and instruction buffer, the buffer controlling means reads the instruction code from the data and instruction buffer and outputs the instruction code to the execution means, and when the instruction code relevant to the fetch access is absent in the data and instruction buffer, the buffer controlling means transfers one page of instruction codes including the instruction code from the non-volatile memory to the data and instruction buffer, reads the instruction code from the data and instruction buffer, and outputs the instruction code to the execution means, and when the data and instruction buffer is switched to a data buffer, the buffer controlling means transfers data in the non-volatile memory, specified by the execution means, to the data buffer.

21. The information processing apparatus according to claim 15, further comprising:
  a data and instruction buffer for storing data and instruction codes; and
  buffer controlling means for using the data and instruction buffer as an instruction buffer when a program is being executed on the non-volatile memory while using the data and instruction buffer as a data buffer when a program is being executed on the volatile memory.

* * * * *